(12) United States Patent
Jefferson

(10) Patent No.: US 6,371,546 B1
(45) Date of Patent: Apr. 16, 2002

(54) TELESCOPIC SUN SCREEN ASSEMBLY

(76) Inventor: Samuel Alexander Jefferson, 200 26th St., Apt. D-205, Atlanta, GA (US) 30309

( * ) Notice: Subject to any disclaimer, the term of this patent is extended or adjusted under 35 U.S.C. 154(b) by 0 days.

(21) Appl. No.: 09/586,328

(22) Filed: Jun. 2, 2000

Related U.S. Application Data

(63) Continuation-in-part of application No. 09/273,874, filed on Mar. 22, 1999, now abandoned, which is a continuation-in-part of application No. 09/116,148, filed on Jul. 16, 1998, now Pat. No. 5,884,684.

(51) Int. Cl.⁷ .................................................. B60J 3/00
(52) U.S. Cl. ..................................................... 296/97.8
(58) Field of Search .............................. 160/197, 202, 160/211, 216, 370.21; 296/97.2, 97.6, 97.8; 224/312

(56) References Cited

U.S. PATENT DOCUMENTS

| | | | |
|---|---|---|---|
| 1,386,174 A | * 8/1921 | Harris | 160/216 |
| 2,204,691 A | 6/1940 | Olsen | 296/97.2 |
| 2,680,042 A | * 6/1954 | Domasky | 296/95.1 |
| 2,833,591 A | * 5/1958 | Kurtzke | 296/97.6 |
| 3,336,072 A | 8/1967 | Leonard | 296/97 |
| 4,248,474 A | 2/1981 | Mandrick | 296/97.6 |
| 4,323,275 A | 4/1982 | Lutz | 296/97 G |
| 4,728,142 A | 3/1988 | Gavagan | 296/97 G |
| 4,792,176 A | 12/1988 | Karford | 296/97.8 |
| 4,929,014 A | 5/1990 | Clark et al. | 296/97.8 |
| 5,112,096 A | 5/1992 | Keenan | 296/97.6 |
| 5,306,065 A | 4/1994 | Ades | 296/97.6 |
| 5,316,361 A | 5/1994 | Miller | 296/97.8 |
| 5,445,427 A | 8/1995 | Vandagriff | 296/97.6 |
| 5,513,892 A | 5/1996 | Thomas | 296/97.2 |
| 5,516,018 A | 5/1996 | Eskandry | 224/312 |
| 5,649,584 A | 7/1997 | Leubecker | 160/370.23 |
| 5,662,371 A | 9/1997 | Gera et al. | 296/97.8 |
| 5,749,618 A | 5/1998 | Jones | 296/97.8 |
| 5,842,748 A | 12/1998 | Cummins | 296/97.2 |
| 5,855,405 A | * 1/1999 | Robles | 296/97.4 |
| 6,139,084 A | * 10/2000 | Miles | 296/97.6 |

FOREIGN PATENT DOCUMENTS

DE    3422624    * 12/1985    ................ 296/97.8

* cited by examiner

Primary Examiner—Joseph D. Pape
Assistant Examiner—Jason Morrow
(74) Attorney, Agent, or Firm—Jason A. Bernstein; Bernstein & Associates, P.C.

(57) ABSTRACT

A telescopic sun screen assembly for use in the interior of an automobile. The sunscreen assembly comprises a sun visor member capable of being mounted to the interior of an automobile, the visor having a compartment and a bottom opening. A housing is receivable within the visor compartment and insertable and removable through the visor bottom opening. The housing has a compartment and a bottom opening that slidingly and telescopically receive a sun screen panel.

The housing and panel may be readily removed from the visor and reinstalled in another visor, or the housing and panel may be readily removed from the visor and another housing and panel reinstalled in the same visor. The housing and panel are thus separable components and may be provided as an aftermarket item separate from the visor.

8 Claims, 3 Drawing Sheets

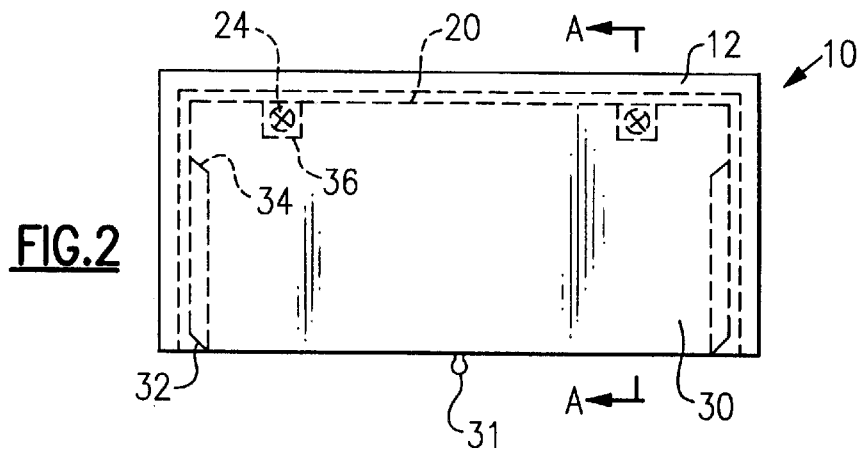
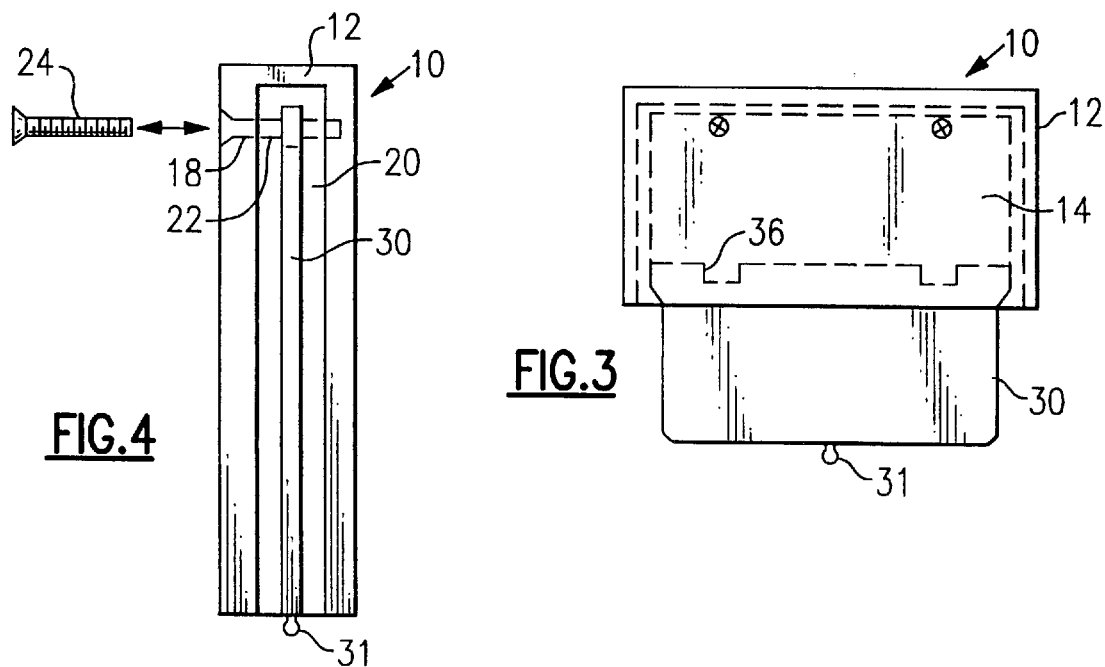
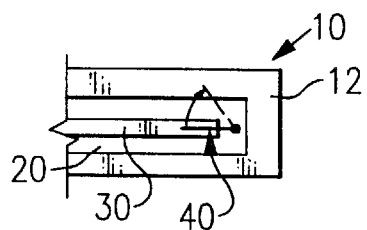

TELESCOPIC SUN SCREEN ASSEMBLY

CROSS-REFERENCE TO RELATED APPLICATION

This is a continuation-in-part of U.S. patent application Ser. No. 09/273,874 filed Mar. 22, 1999 now abandoned, which is a continuation-in-part of U.S. patent application Ser. No. 09/116,148 filed Jul. 16, 1998, now U.S. Patent No. 5,884,684, issued Mar. 23, 1999, both disclosures of which are hereby incorporated by reference in their entirety.

FIELD OF THE INVENTION

The present invention is directed to the field of sun screens that are particularly adapted for interchangeable attachment to the interior of an automobile, such as an automotive sun visor.

BACKGROUND OF THE INVENTION

The present invention relates to a user friendly sun screen assembly that has particular utility for mounting to the interior of an automobile, such as the sun visor thereof. Anyone who has driven in the glaring sun of summer, or faced the sun reflected off a snowy terrain, knows the value of a sun screen and the comfort it can provide the driver. Many automobiles, particularly later models, come with a windshield having a darken area of perhaps four inches along the top of the windshield. However, this is often insufficient under the driving conditions noted above.

Supplementary sun screen devices, generally attachable to the pivotal sun visor normally provided above the windshield, are commercially available from automotive supply shops. One such commercial device is the AXIUS AUTO-SHADE VISOR, a trademark of Auto-Shade, L.L.C. of Moorpark, Calif. 93021. The device, commercially promoted as a visor glare reducer, comprises a darkened, translucent, plastic, rectangular shield having a spring biased clip for attaching to the lower or free edge of the sun visor of the automobile. The device is constructed to pivot about the clip such that the driver can flip the device to a position in close proximity to the windshield. Unfortunately, such a device is rather obtrusive because it mounts onto the visor, and would have to be flipped often to adjust to the changing glare and position of the sun.

In contrast, the assembly of the present invention comprises an unobtrusive and interchangeable device that provides for sun protection to the driver. The manner by which the assembly hereof meets these challenges will become apparent in the following description, particularly when read in conjunction with the accompanying drawings.

SUMMARY OF THE INVENTION

This invention relates to a telescopic sun screen assembly for use in the interior of an automobile. The sunscreen assembly comprises a sun visor member capable of being mounted to the interior of an automobile, the visor having a compartment and a bottom opening. A housing is receivable within the visor compartment and removable through the visor bottom opening. The housing has a compartment and a bottom opening that slidingly and telescopically receive a sun screen panel.

The visor may have at least one aperture and the housing may have at least one aperture capable of being aligned with the visor aperture, and a fastener receivable within the aligned apertures for securing the housing within the visor. The panel has at least one notch that is capable of receiving the fastener when the panel is moved to an up position within the housing and visor. The housing has at least one inwardly extending wall generally adjacent the bottom opening thereof and the panel has at least one outwardly extending wall generally at an upper portion thereof that abuts the inwardly extending wall when the panel is moved to a down position.

At least one retainer can be attached to the housing or the visor, the retainer capable of being positioned to lock the panel within the housing and capable of being positioned to permit the panel being extended from the housing. Also, a tab or the like may be provided extending from the panel to facilitate extending and retracting the panel from the housing. Furthermore, the housing and panel may be provided as an aftermarket item separately provided from the visor.

Accordingly, an object of this invention is to provide a convenient sun screen that is attached to a sun visor in a vehicle in an unobtrusive manner.

A further object of the present invention is the provision of a sun screen that is readily interchangeable with similar sun screens to provide any desired degree of sun protection to a user thereof.

Another object of the present invention is the provision of a compact unit that may be readily installed within and removed from an automobile's interior.

These and other objects will become apparent to those skilled in the art from the following description, particularly when read in conjunction with the accompanying drawings.

BRIEF DESCRIPTION OF DRAWINGS

The invention is illustrated in the drawings in which like reference characters designate the same or similar parts throughout the figures of which:

FIG. 2 is a plan view of the telescopic sun screen assembly of FIG. 1, with a sun screen panel in an up position.

FIG. 3 is a plan view of the telescopic sun screen assembly of FIG. 1, with the sun screen in a down position.

FIG. 4 is a sectional view of the telescopic sun screen assembly of FIG. 2 taken at line A—A.

FIG. 5 is a detail view of a bottom of the telescopic sun screen assembly with a retaining member.

Figure 1:
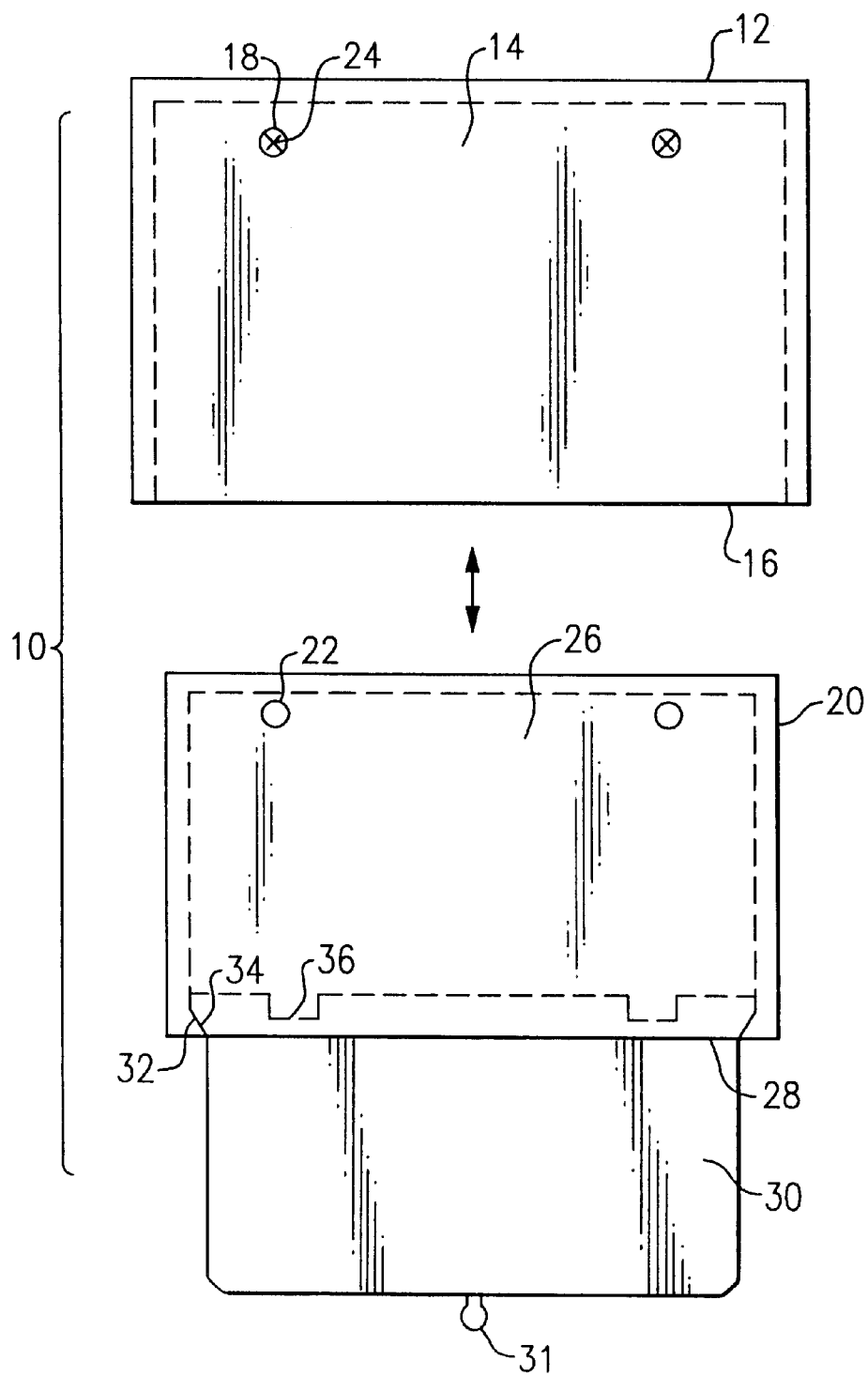
FIG. 1 is an exploded plan view of a telescopic sun screen assembly according to the present invention.

It should be noted that the drawing figures are not to scale, but instead show the various components of the present invention disproportionately thick in order to illustrate the particular features thereof.

DETAILED DESCRIPTION OF THE PREFERRED EMBODIMENTS

This invention relates to a non-obtrusive sun screen assembly that can be installed within a sun visor in a vehicle and can be readily interchanged with other similar sun screen assemblies, with the particular sun screen assembly selected for a desired sun screening, color, size, or the like. The invention hereof will now be described with reference to the several figures, where like reference numerals represent like components or features throughout the various views.

FIGS. 1–4 illustrate a first preferred embodiment 10 of the sun screen assembly of the present invention. In this embodiment, there is provided a sun visor member 12 made of a construction and with materials similar to conventional pivoting sun visors commonly provided in vehicles. The visor 12 is capable of being attached to the vehicle by conventional pivotal or other attachments as are well known in the art.

The visor 12 is adapted for use in the present invention by providing a compartment 14 and a bottom opening 16 formed therein. The compartment 14 can have a generally rectangular shape, or another regular or irregular shape. At least one and preferably two apertures 18 are defined in at least one side of the visor 12, for purposes that will be described hereinafter.

The visor compartment 14 is shaped and sized to removably receive therein a housing 20. The housing 20 may thus have a generally rectangular shape to conform to the shape of the visor compartment 14. The housing 20 is made of a plastic, metal, composite, or another material known in the art. The housing 20 is relatively thin, that is, the housing 20 is preferably thinner than a conventional sun visor in an automobile, and is not thicker or if thicker then is only slightly so.

The housing 20 has at least one and preferably two apertures 22 defined in at least one side thereof which are capable of substantially aligning with the visor apertures 18 when the housing is installed within the visor 12. The apertures 18 and 22 when aligned can receive therethrough a removable fastener 24 such as a screw, bolt, dowel, pin, or other conventional fastener, for removably securing the housing 20 within the visor 12. The housing 20 can thus be readily installed in and removed from the visor 12, as may be desired.

The housing 20 has a compartment 26 and a bottom opening 28 formed therein. The housing compartment 26 is shaped and sized to slidably receive therein a sun screen panel 30. The housing compartment 26 and panel 30 may have a generally rectangular shape, or another regular or irregular shape. The panel 30 can be made of a semi-rigid and generally translucent material such as a tinted thermoplastic resin or another material known to those skilled in the art selected to provide features including being compact and lightweight and providing a sun screening function. To facilitate sliding movement of the panel 30 within the housing compartment 26, i.e., extending or retracting, an extended tab 31 may be provided.

The housing 20 has at least one and preferably two inwardly extending walls 32 generally adjacent the bottom opening 28 and the panel 30 has at least one and preferably two outwardly extending walls 34 generally at an upper portion thereof that abut the housing compartment walls 32 when the panel 30 is moved to a down position to prevent the panel 30 from being removed entirely from the housing compartment 26. It will be understood by those skilled in the art that the walls 32 and 34 may alternatively be provided by extension arms, tabs, pins, or the like.

The panel 30 may have at least one and preferably two notches 36 defined therein that are capable of receiving the fasteners 24 when the panel 30 is moved to an up position within the housing 20 and visor 12. The notches 36 may have a generally rectangular, semi-circular, or other regular or irregular shape. The sun screen panel 30 may thereby have sides with a surface area that is only slightly less than the surface area of sides of the housing 20.

Referring now to FIG. 5, there may be provided a retainer 40, such as a pivotal arm, tab, clip, latch, or other retainer known in the art, attached to the bottom of the housing 20 or attached to the visor 12. The retainer 40 is capable of being moved to a locked position generally abutting the bottom of the panel 30 so that the panel 30 can not be extended from the housing 20, or being moved to an open position so that the retainer 40 does not impede sliding the panel from the housing 20. Alternatively, the retainer 40 may be provided by a pushbutton, pin, dowel, or other elongate member that may extend through the panel 30 and at least a portion of the housing 20 and the visor 12.

Figure 6:
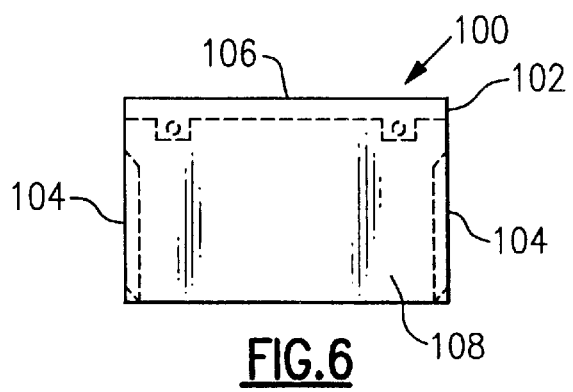
FIG. 6 is a plan view of a second embodiment of the present telescopic sun screen assembly invention.

Referring now to FIG. 6, there is provided a second embodiment 100 of the present invention which is similar to the first embodiment 10. In the second embodiment 100, however, the housing 102 has open sides 104 and a closed top 106, so that the panel 108 has a maximum length.

Figure 7:
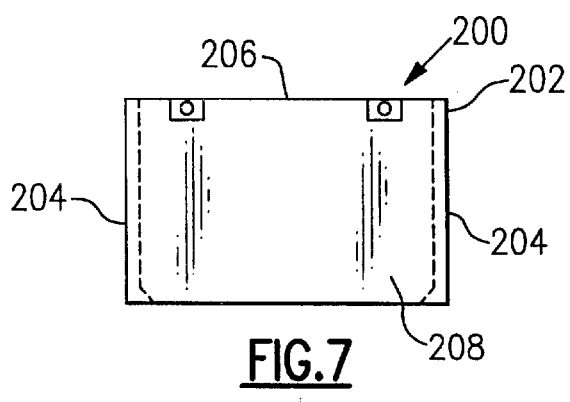
FIG. 7 is a plan view of a third embodiment of the present telescopic sun screen assembly invention.

Referring now to FIG. 7, there is provided a third embodiment 200 of the present invention which is similar to the first embodiment 10. In the third embodiment 200, however, the housing 202 has closed sides 204 and an open top 206, so that the panel 208 has a maximum height.

Figure 8:
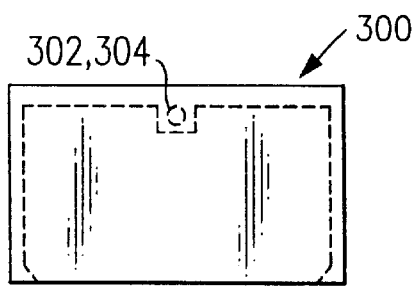
FIG. 8 is a plan view of a fourth embodiment of the present telescopic sun screen assembly invention.

Referring now to FIG. 8, there is provided a fourth embodiment 300 of the present invention which is similar to the first embodiment 10. In the fourth embodiment 300, however, there is provided only one visor aperture 302 and only one housing aperture 304.

Optional accessories may be provided for the sun screen assembly. For example, a vanity mirror (not shown) may be attached to the visor 10. The mirror may be attached by epoxy, hook and loop fasteners, or like fasteners, or be built into the visor. Also, a pocket with a cover flap (not shown) may be provided for storing items such as sunglasses, papers, and other items commonly useful to an automobile driver.

In operation, the user may selectively insert the housing 20 and panel 30 into the visor 12, with the particular housing 20 and panel 30 selected based on the desired sun screening, color, size, etc. desired. The fasteners 24 are installed to secure the housing 20 and panel 30 in the visor 12. The user may then slidingly extend or retract the panel 30 relative to housing 20 to provide sun screening protection as desired. The user can further remove the housing 20 and panel 30 from the visor 12 and reinstall a different housing 20 and panel 30 to provide a different translucency panel 30 and degree of sun screening protection, to provide a different color sun screen panel 30, to provide a replacement panel 30 in the event the of a mechanical failure, or for other reasons. Also, the user may remove the housing 20 and panel 30 and reinstall them in another vehicle as may be desired such as when the user purchases a new vehicle. The housing 20 and panel 30 may thus be provided as an aftermarket product for use in conjunction with visors 12 adapted to receive such housings 20 and panels 30.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims. All patents, applications and publications referred to herein are hereby incorporated by reference in their entirety.

I claim:

1. A sun screen assembly, comprising:
   a) a housing comprising
      (i) a first member being generally parallelpiped in cross-section and having a first end and a second end, (ii) a first leg being generally parallelpiped in cross-section and having a first end and a second end, said first leg first end being fixedly attached to said first member first end such that a substantially right angle is created and maintained when said sun screen assembly is assembled, said first leg further comprising a first tab extending outward from one side and proximate to said first leg second end, (iii) a second leg being generally parallelpiped in cross-section and having a first end and a second end, said second leg first end being fixedly attached to said first member second end such that a substantially right angle is created and maintained when said sun screen assembly is assembled, said second leg further comprising a second tab extending outward from one side and proximate to said second leg second end, said first and second tabs facing inward toward each other, (iv) a substantially flat front support panel and an opposing substantially flat rear support panel between which said first member, first leg and second leg are attached along three sides of the periphery of said support panels, at least one of said support panels having at least one aperture defined therein proximate to said first leg and capable of receiving a fastener; and, b) a substantially flat rectangular sun screen panel comprising
   (i) first, second, third and fourth sides, said first and third sides being parallel and said second and fourth sides being parallel,
   (ii) at least one notch defined in said first side, said at least one notch being in alignment with said at least one aperture in said support panel when said sun screen panel is slidingly mounted within said housing,
   (iii) a first projection extending coplanar with and outward from said second side proximate to said first side,
   (iv) a second projection extending coplanar with and outward from said fourth side proximate to said first side,
   said sun screen panel being received within said housing such that said sun screen panel can slide within said housing, but is unremovable from said housing,
   said sun screen assembly being capable of mounting at least partially within a slotted compartment having an opening and created between a front face and a rear face of a conventional sun visor, said sun visor being adapted to have at least one aperture defined therein capable of receiving a fastener.

2. The sun screen assembly according to claim 1, further comprising at least one fastener capable of removably securing said housing within said visor.

3. The sun screen assembly according to claim 1, further comprising at least one retainer associated with said housing or said visor and capable of being positioned to lock said panel within said housing and capable of being positioned to permit said panel being extended from said housing.

4. The sun screen assembly according to claim 1, wherein said panel is made of a semi-rigid and generally translucent material.

5. The sun screen assembly according to claim 1, further comprising a tab extending from said third side of said sun screen panel.

6. A sun screen assembly, comprising:
a) a housing comprising
   (i) a first member being generally parallelpiped in cross-section and having a first end and a second end,
   (ii) a first leg being generally parallelpiped in cross-section and having a first end and a second end, said first leg first end being fixedly attached to said first member first end such that a substantially right angle is created and maintained when said sun screen assembly is assembled, said first leg further comprising a first tab extending outward from one side and proximate to said first leg second end,
   (iii) a second leg being generally parallelpiped in cross-section and having a first end and a second end, said second leg first end being fixedly attached to said first member second end such that a substantially right angle is created and maintained when said sun screen assembly is assembled, said second leg further comprising a second tab extending outward from one side and proximate to said second leg second end, said first and second tabs facing inward toward each other,
   (iv) a substantially flat rectangular support panel having a front surface and a rear surface to which said first member, first leg and second leg are attached along three sides of the periphery of said support panel, said support panel having at least one aperture defined therein proximate to said first leg and capable of receiving a fastener;

b) a substantially flat rectangular sun screen panel comprising
   (i) first, second, third and fourth sides, said first and third sides being parallel and said second and fourth sides being parallel,
   (ii) at least one notch defined in said first side, said at least one notch being in alignment with said at least one aperture in said support panel when said sun screen panel is slidingly mounted within said housing,
   (iii) a first projection extending coplanar with and outward from said second side proximate to said first side,
   (iv) a second projection extending coplanar with and outward from said fourth side proximate to said first side,
   said sun screen panel being received within said housing such that said sun screen panel can slide within said housing, but is unremovable from said housing; and, c) a sun visor associated with an automobile, said sun visor comprising
   (i) a substantially flat panel having a front face and a rear face
   (ii) a compartment defined therebetween with an opening exposed at one side of said sun visor and adapted to receive said housing and said sun panel
   (iii) at least one aperture defined in said sun visor extending at least partially through at least one surface of said visor;

d) at least one fastening means received within said at least one sun visor aperture and said at least one housing aperture.

7. The sun screen assembly according to claim 6, further comprising at least one retainer associated with said housing or said visor and capable of being positioned to lock said panel within said housing and capable of being positioned to permit said panel being extended from said housing.

8. The sun screen assembly according to claim 6, further comprising a tab extending from said third side of said sun screen panel.

* * * * *